(12) United States Patent
Raghunathan et al.

(10) Patent No.: US 12,254,111 B2
(45) Date of Patent: Mar. 18, 2025

(54) INFORMATION SECURITY SYSTEMS AND METHODS FOR EARLY CHANGE DETECTION AND DATA PROTECTION

(71) Applicant: BANK OF AMERICA CORPORATION, Charlotte, NC (US)

(72) Inventors: Sridhar Raghunathan, Chennai (IN); Kevin Tran, Frisco, TX (US); Jyotsana Utsav, Frisco, TX (US)

(73) Assignee: Bank of America Corporation, Charlotte, NC (US)

( * ) Notice: Subject to any disclaimer, the term of this patent is extended or adjusted under 35 U.S.C. 154(b) by 343 days.

(21) Appl. No.: 17/646,727

(22) Filed: Jan. 3, 2022

(65) Prior Publication Data

US 2023/0214518 A1 Jul. 6, 2023

(51) Int. Cl.
*G06F 15/16* (2006.01)
*G06F 16/23* (2019.01)
*G06F 16/28* (2019.01)
*G06F 21/62* (2013.01)
*G06F 40/40* (2020.01)

(52) U.S. Cl.
CPC ...... *G06F 21/6227* (2013.01); *G06F 16/2358* (2019.01); *G06F 16/285* (2019.01); *G06F 40/40* (2020.01)

(58) Field of Classification Search
CPC .............. G06F 21/6227; G06F 16/285; G06F 16/2358; G06F 40/40
See application file for complete search history.

(56) References Cited

U.S. PATENT DOCUMENTS

| | | |
|---|---|---|
| 6,000,945 A | 12/1999 | Sanchez-Lazer et al. |
| 7,016,894 B2 | 3/2006 | Saeki |
| 7,050,753 B2 | 5/2006 | Knutson |
| 7,209,923 B1 | 4/2007 | Cooper |
| 7,246,128 B2 | 7/2007 | Jordahl |
| 7,346,601 B2 | 3/2008 | Chaudhuri et al. |
| 7,392,474 B2 | 6/2008 | Chen et al. |
| 7,490,099 B2 | 2/2009 | Myers et al. |
| 7,599,909 B2 | 10/2009 | Aldridge |
| 7,627,432 B2 | 12/2009 | Wilkinson |
| 7,668,860 B2 | 2/2010 | Naibo et al. |
| 7,685,082 B1 | 3/2010 | Coletta et al. |
| 7,716,571 B2 | 5/2010 | Tien et al. |
| 7,720,886 B2 | 5/2010 | Ponessa |
| 7,734,566 B2 | 6/2010 | Caracas et al. |
| 7,800,613 B2 | 9/2010 | Hanrahan et al. |

(Continued)

*Primary Examiner* — Normin Abedin

(57) ABSTRACT

A system includes a memory and a processor. The memory stores classification models that indicate a data classification to apply to data columns of one or more databases. The processor is configured to periodically access one or more databases and determine that a data table has been newly created or modified. The processor is further configured to determine whether a data column of the data table has an existing data classification, and in response to determining that the data column does not have an existing data classification, determine from the plurality of classification models a particular classification model to use for the data column. The processor is further configured to send instructions to a classification server to apply a particular data classification of the particular classification model to the data column in the classification database.

20 Claims, 3 Drawing Sheets

(56) References Cited

U.S. PATENT DOCUMENTS

| | | |
|---|---|---|
| 7,904,451 B2 | 3/2011 | Cobb et al. |
| 7,930,262 B2 | 4/2011 | Friedlander et al. |
| 7,953,694 B2 | 5/2011 | Colossi et al. |
| 7,967,731 B2 | 6/2011 | Kil |
| 8,065,326 B2 | 11/2011 | Li et al. |
| 8,095,499 B2 | 1/2012 | Thanu |
| 8,170,841 B2 | 5/2012 | Pinto et al. |
| 8,190,422 B2 | 5/2012 | Ascoli et al. |
| 8,275,772 B2 | 9/2012 | Aphinyanaphongs et al. |
| 8,301,482 B2 | 10/2012 | Reynolds et al. |
| 8,364,724 B2 | 1/2013 | Stolte et al. |
| 8,375,041 B2 | 2/2013 | Webster et al. |
| 8,566,321 B2 | 10/2013 | Majumdar |
| 8,650,152 B2 | 2/2014 | Dettinger et al. |
| 8,655,918 B2 | 2/2014 | Chitnis et al. |
| 8,700,629 B2 | 4/2014 | Engel et al. |
| 8,775,230 B2 | 7/2014 | Casas et al. |
| 8,782,577 B2 | 7/2014 | Fischer et al. |
| 8,805,739 B2 | 8/2014 | Brown et al. |
| 8,818,838 B1 | 8/2014 | Sharma |
| 8,874,540 B2 | 10/2014 | Shepherd et al. |
| 8,874,552 B2 | 10/2014 | Jehuda |
| 8,996,555 B2 | 3/2015 | Kuchmann-Beauger et al. |
| 9,330,222 B2 | 5/2016 | White et al. |
| 9,514,213 B2 | 12/2016 | Wood et al. |
| 9,710,506 B2 | 7/2017 | Nath |
| 9,798,781 B2 | 10/2017 | Apps et al. |
| 9,910,910 B2 | 3/2018 | Riggs et al. |
| 9,990,380 B2 | 6/2018 | Riggs et al. |
| 10,127,596 B1 | 11/2018 | Franke et al. |
| 10,204,153 B2 | 2/2019 | Morimoto et al. |
| 10,394,532 B2 | 8/2019 | Bar-Or et al. |
| 10,614,165 B2 | 4/2020 | Ferrucci et al. |
| 10,699,051 B1 | 6/2020 | Zhang et al. |
| 2005/0192939 A1* | 9/2005 | Bird .................... G06F 21/6227 |
| 2020/0301895 A1* | 9/2020 | Harrison ............. G06F 16/2423 |
| 2022/0138229 A1* | 5/2022 | Vandeventer .......... G06N 20/00 |
| | | 707/691 |

\* cited by examiner

INFORMATION SECURITY SYSTEMS AND METHODS FOR EARLY CHANGE DETECTION AND DATA PROTECTION

TECHNICAL FIELD

The present disclosure relates generally to information security, and more specifically to information security systems and methods for early change detection and data protection.

BACKGROUND

Information security is a critical factor in protecting and safeguarding confidential and proprietary data used to support data warehouses. Having accurate data classifications for data early in the development cycle is an important tool for safeguarding sensitive information. Typically, data classification is a subjective decision based on the best judgment of an individual. With employee turnover and flexible job assignments, classification of data may become inconsistent, inaccurate, or even nonexistent. In addition, data classification is labor intensive that is often a reactive exercise rather than proactive.

SUMMARY

Information security is a critical factor in protecting and safeguarding confidential and proprietary data used to support data warehouses. Having accurate data classifications for data early in the development cycle is an important tool for safeguarding sensitive information. Typically, data classification is a subjective decision based on the best judgment of an individual. With employee turnover and flexible job assignments, classification of data may become inconsistent, inaccurate, or even nonexistent. In addition, data classification is labor intensive that is often a reactive exercise rather than proactive.

To address these and other problems with existing information security systems, this disclosure contemplates system and methods that provide for the early detection of sensitive data elements in databases. The disclosed embodiments proactively monitor multiple databases for any changes or additions to the database. Once a change or addition is detected, the disclosed embodiments extract any data columns that were changed or added. If the extracted column does not currently have any data classifications, attributes of the extracted column (e.g., column name, size, data type, etc.) are compared in real time to similar attributes of pre-trained classification models. Once a particular classification model is matched to the extracted column, embodiments apply data classifications of the classification model to the extracted column. As a result, data classifications may be automatically applied to data columns that are lacking data classifications. In situations where the data classifications indicate sensitive information (e.g., social security numbers, account numbers, etc.) the data column may be automatically protected from unwanted access by the automatic Applications of the data classification.

In one embodiment, a method for automatically applying data classifications includes determining, by periodically analyzing multiple databases, that a data table has been newly created or modified. The method further includes extracting a data column from the data table that has been newly created or modified and determining whether the data column has an existing data classification. The method further includes determining from a plurality of classification models, by comparing data attributes of the data column to data attributes of the plurality of classification models, a particular classification model to use for the data column. Each classification model indicates a data classification to apply to one or more data columns of the one or more databases. The method further includes sending one or more instructions to a classification server. The instructions are operable to apply a particular data classification of the particular classification model to the data column in a classification database.

A practical application of the systems and methods described herein is that data classifications may be automatically and routinely applied to newly created or modified data columns that may otherwise have no data classification. By automatically applying data classifications to data columns that would otherwise have no data classification, information security policies may be automatically enforced and data security may be increased. For example, a data column storing social security numbers may have a sensitive data classification automatically applied shortly after the data column is created without any human intervention. The sensitive data classification may restrict access to the data column to authorized personnel. As a result, the automatic classification of the data column may increase the data security of the data column.

Embodiments of the present disclosure provide technological solutions to technological problems. For example, the disclosed embodiments automatically and routinely apply data classifications to newly created or modified data columns of databases without any interaction from personnel. As a specific example, a data classification that indicates sensitive information may be applied to a newly-created data column that stores customer's social security numbers. As a result, the organization's sensitive data may be protected from unwanted access. Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Information security is a critical factor in protecting and safeguarding confidential and proprietary data used to support data warehouses. Having accurate data classifications for data early in the development cycle is an important tool for safeguarding sensitive information. Typically, data classification is a subjective decision based on the best judgment of an individual. With employee turnover and flexible job assignments, classification of data may become inconsistent, inaccurate, or even nonexistent. In addition, data classification is labor intensive that is often a reactive exercise rather than proactive.

To address these and other problems with existing information security systems, this disclosure contemplates system and methods that provide for the early detection of sensitive data elements in databases. The disclosed embodiments proactively monitor multiple databases for any changes or additions to the database. Once a change or addition is detected, the disclosed embodiments extract any data columns that were changed or added. If the extracted column does not currently have any data classifications, attributes of the extracted column (e.g., column name, size, data type, etc.) are compared in real time to similar attributes of pre-trained classification models. Once a particular classification model is matched to the extracted column, embodiments apply data classifications of the classification model to the extracted column. As a result, data classifications may be automatically applied to data columns that are lacking data classifications. In situations where the data classifications indicate sensitive information (e.g., social security numbers, account numbers, etc.), the data column may be automatically protected from unwanted access by the automatic application of the data classification.

Figure 1:
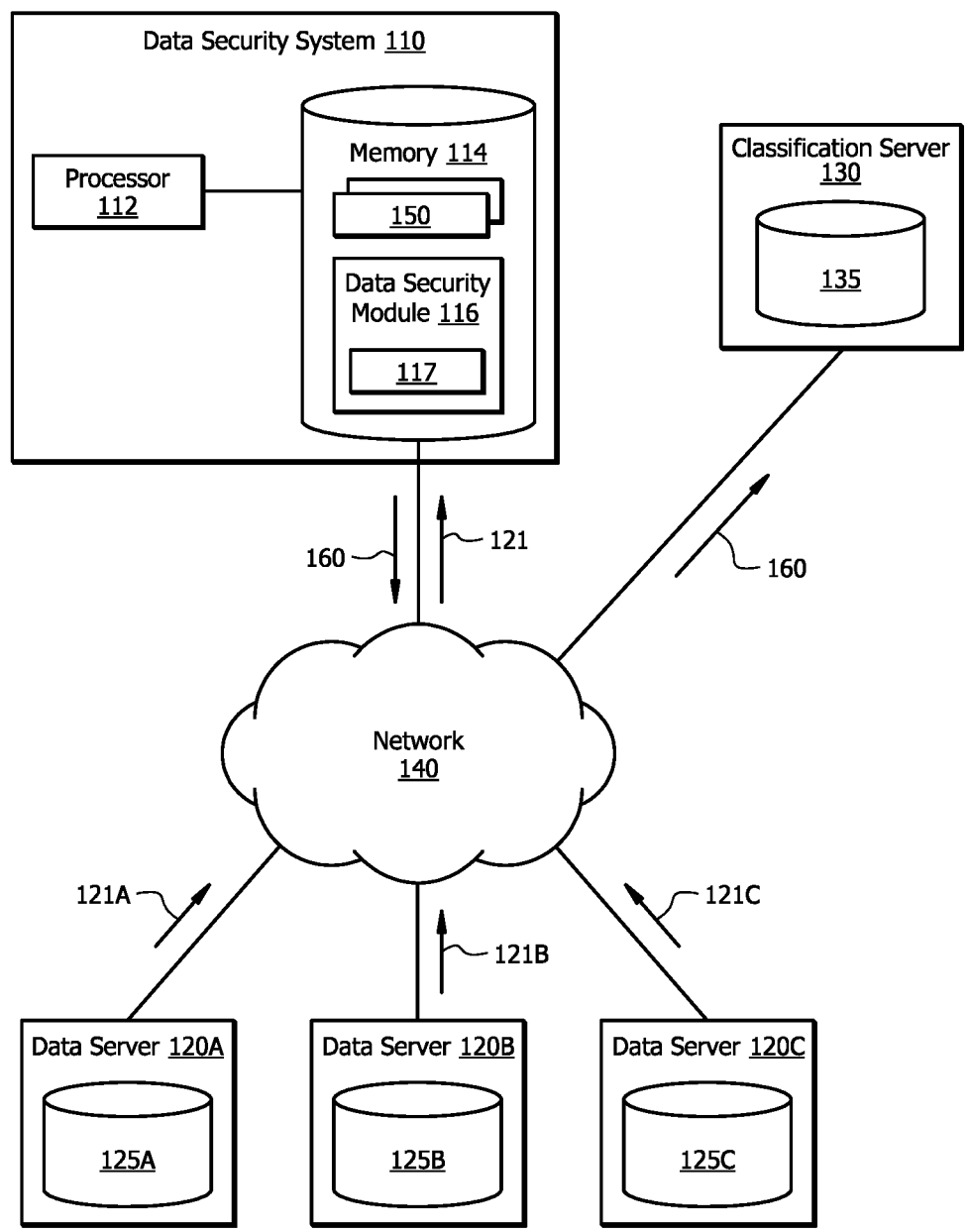
FIG. 1 is a schematic diagram of an example system for early change detection and data protection, according to certain embodiments.
Figure 2:
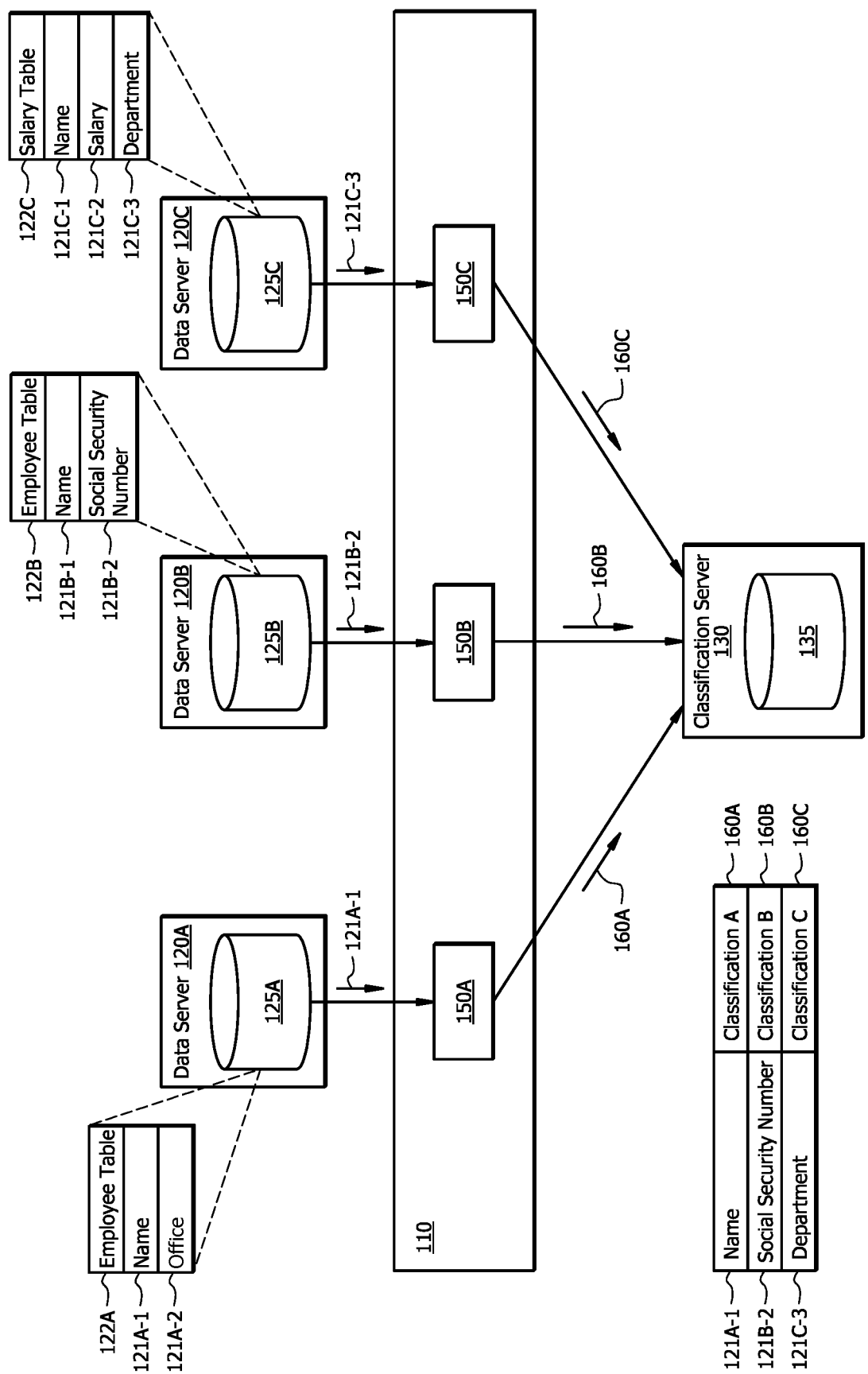
FIG. 2 illustrates example operations of the system for early change detection and data protection of FIG. 1, according to certain embodiments.
Figure 3:
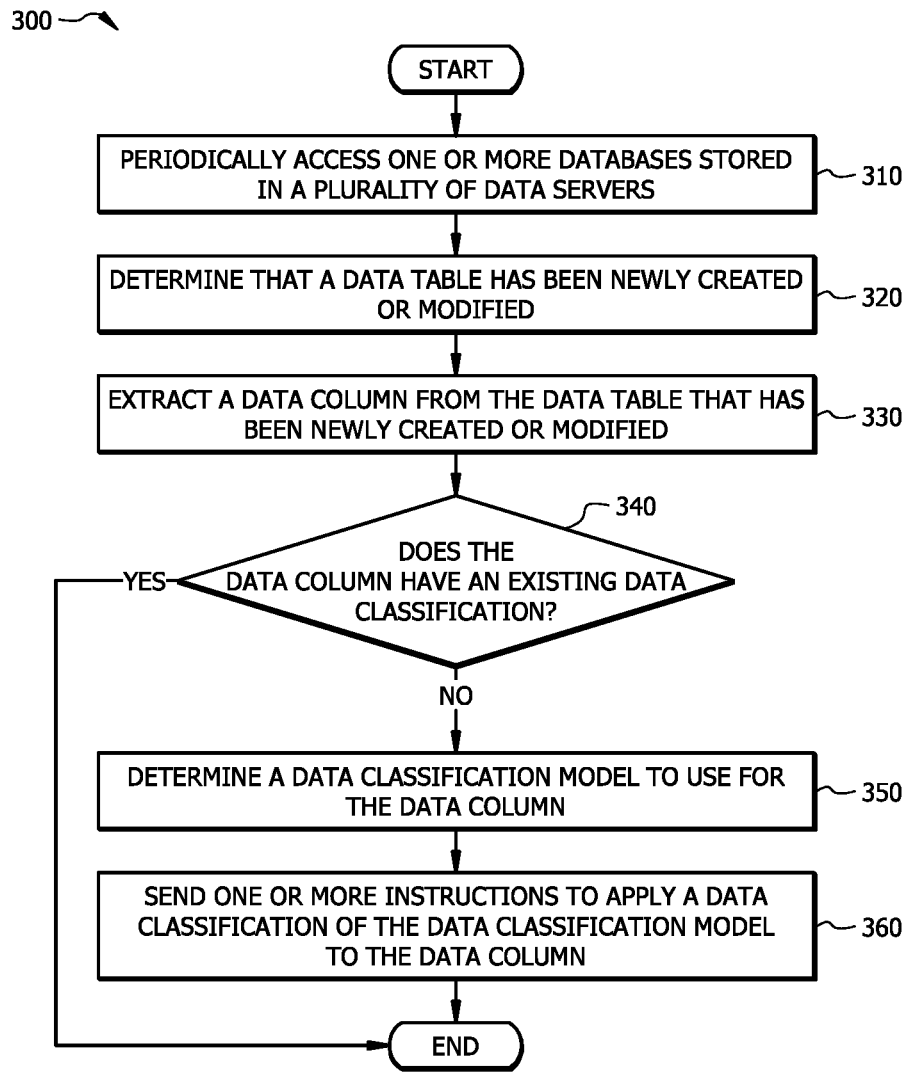
FIG. 3 is a flowchart of a method for early change detection and data protection, according to certain embodiments.

FIGS. 1 through 3 show example systems and methods for early change detection and data protection. FIG. 1 illustrates an example system for early change detection and data protection. FIG. 2 illustrates example operations of the system for early change detection and data protection of FIG. 1. FIG. 3 illustrates an example method for early change detection and data protection.

FIG. 1 illustrates an example data security system 100 for providing early change detection and data protection, according to certain embodiments. Data security system 100 includes a computer system 110, multiple data servers 120 (e.g., 120A-120C), a classification server, and a network 140. Computer system 110 is communicatively coupled to data servers 120 and classification server 130 via network 140 using any appropriate wired or wireless telecommunication technology.

In general, computer system 110 of data security system 100 periodically accesses data servers 120 to check whether any data table within any database 125 (e.g., 125A-C) has been created or modified at the column level since the last periodic check. If computer system 110 detects that a data table within a particular database 125 has been created or modified at the column level since the last periodic check, computer system 110 extracts the newly-created or newly-modified data column 121. Computer system 110 then determines whether the data column 121 already has a data classification. If data column 121 does not have a data classification, computer system 110 analyzes and selects a particular classification model 150 from classification models 150 stored in memory 114. For example, computer system 110 may compare data attributes (e.g., a column name, a datatype, a data size, etc.) to similar data attributes of classification models 150 in order to select a particular classification model 150 for data column 121. Once a particular classification model 150 is chosen for data column 121, computer system 110 then applies a data classification 160 of the particular classification model 150 to the data column 121. This may include sending data classification 160 to a classification server 130 where it is applied to data column 121 in classification database 135. As a result, data classification 160 may be applied to data column 121 where data column 121 may otherwise linger for long amounts of time without a data classification. In situations where data within data column 121 is sensitive or private information (e.g., social security numbers), the automatic application of data classification 160 to data column 121 secures the data and prevents unwanted access by unauthorized personnel.

Computer system 110 may be any appropriate computing system in any suitable physical form. As example and not by way of limitation, computer system 110 may be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a mobile telephone, a personal digital assistant (PDA), a server, a tablet computer system, an augmented/virtual reality device, or a combination of two or more of these. Where appropriate, computer system 110 may include one or more computer systems 110; be unitary or distributed; span multiple locations; span multiple machines; span multiple data centers; or reside in a cloud, which may include one or more cloud components in one or more networks. Where appropriate, one or more computer systems 110 may perform without substantial spatial or temporal limitation one or more steps of one or more methods described or illustrated herein. As an example and not by way of limitation, one or more computer systems 110 may perform in real time or in batch mode one or more steps of one or more methods described or illustrated herein. One or more computer systems 110 may perform at different times or at different locations one or more steps of one or more methods described or illustrated herein, where appropriate.

Processor 112 is any electronic circuitry, including, but not limited to a microprocessor, an application specific integrated circuits (ASIC), an application specific instruction set processor (ASIP), and/or a state machine, that communicatively couples to memory 114 and controls the operation of remote computing system 110. Processor 112 may be 8-bit, 16-bit, 32-bit, 64-bit or of any other suitable architecture. Processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 112 may include other hardware that operates software to control and process information. Processor 112 executes software stored in memory to perform any of the functions described herein. Processor 112 controls the operation and administration of computer system 110 by processing information received from data servers 120 and memory 114. Processor 112 may be a programmable logic device, a microcontroller, a microprocessor, any suitable processing device, or any suitable combination of the preceding. Processor 112 is not limited to a single processing device and may encompass multiple processing devices.

Memory 114 may store, either permanently or temporarily, data such as classification models 150, operational software such as data security module 116, or other information for processor 112. Memory 114 may include any one or a combination of volatile or non-volatile local or remote devices suitable for storing information. For example, memory 114 may include random access memory (RAM), read only memory (ROM), magnetic storage devices, optical storage devices, or any other suitable information storage device or a combination of these devices.

Data security module 116 represents any suitable set of instructions, logic, or code embodied in a computer-readable storage medium. For example, data security module 116 may be embodied in memory 114, a disk, a CD, or a flash drive. In particular embodiments, data security module 116 may include instructions 117 (e.g., a software application) executable by processor 112 to perform one or more of the functions described herein. In general, data security module 116 sends data classifications 160 to classification server 130 via network 140.

Data server 120 is any appropriate computing or networking element or node. In some embodiments, data server 120 is a database server that stores or is otherwise communicatively coupled to one or more databases 125. Data server 120 may be, for example, a SQL server, an Oracle server, a Hive server, a Teradata server, a Hadoop server, and the like. Databases 125 may either stored internally within data servers 120 or on another computing system within the same data center.

Likewise, classification server 130 is any appropriate computing or networking element or node. In some embodiments, classification server 130 is a database server that stores or is otherwise communicatively coupled to one or more classification databases 135. classification server 130 may be, for example, a SQL server, an Oracle server, a Hive server, a Teradata server, a Hadoop server, and the like. Classification database 135 may either stored internally within classification server 130 or on another computing system within the same data center.

Network 140 allows communication between and amongst the various components of data security system 100. For example, computing system 110, data servers 120, and classification server 130 may communicate via network 140. This disclosure contemplates network 140 being any suitable network operable to facilitate communication between the components of data security system 100. Network 140 may include any interconnecting system capable of transmitting audio, video, signals, data, messages, or any combination of the preceding. Network 140 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network.

Classification models 150, in general, are used to apply data classifications 160 to data columns 121 that do not already have data classifications. Each classification model 150 stores or otherwise indicates a particular data classification 160 that may be applied to one or more data columns 121 of databases 125. Each classification model 150 may have attributes such as a name, datatype, data size, creator information, etc. that may be compared to similar attributes of data column 121 in order to select an appropriate matching classification model 150 for data column 121. As an example, a particular classification model 150B may have a name attribute of "social security number" and a data classification 160 of "Classification B." When a newly-created data column 121 having a column name attribute of "social security number" is needing a data classification, computer system 110 may match the name attribute of the newly-created data column 121 to classification model 150B and proceed to apply data classification 160 of classification model 150B (e.g., "Classification B") to the newly-created data column 121.

In some embodiments, data security system 100 utilizes a data collection and training operation to create classification models 150. For example, data security system 100 may first access data servers 120 to collect database inventory and data classifications stored in databases 125. Data security system 100 may then consolidate the collected database inventory and data classifications in order to create classification models 150. For example, if data security system 100 collect multiple data columns 121 that each have a name attribute of "department" and an existing data classification 160 of "Classification C," data security system 100 may create a classification model 150C that has a name attribute of "department" and an existing data classification 160 of "Classification C." In some embodiments, data security system 100 utilizes various analysis techniques to evaluate the accuracy of each created classification models 150. For example, data security system 100 may utilize natural language processing, bayes classifiers, linear classifiers, deep neural networks, support vector machines, and the like to evaluate the accuracy of each classification model 150.

Data classification 160 is any appropriate label, setting, etc. that may be applied to data column 121 in order to indicate a type of data that is stored in data column 121. For example, data classification 160 may be "ss number" for social security numbers. As another example, data classification 160 may be "act number" for customer account numbers. As yet another example, data classification 160 may be "dept name" for the names of employees' assigned departments. In some embodiments, each data classification 160 may have an associated security setting. For example, data classifications 160 of "ss number" and "act number" may each have an associated security setting of "restricted" or "private" in order to limit access to the data in data column 121 to only authorized personnel, while data classification 160 of "dept name" may have an associated security setting of "unrestricted" or "public" in order to allow access to the data in data column 121 to anyone.

In operation, computer system 110 of data security system 100 periodically accesses data servers 120 to check whether any data table within any database 125 (e.g., 125A-C) has been created or modified at the column level since the last periodic check. For example, computer system 110 may access each database 125 every hour to check whether any data table has been created or modified at the column level since the last periodic check. If computer system 110 detects that a data table within a particular database 125 has been created or modified at the column level since the last periodic check, computer system 110 extracts the newly-created or newly-modified data column 121.

Once data column 121 is extracted, computer system 110 analyzes data column 121 to determine whether data column 121 currently has an applied data classification. If computer system 110 determines that data column 121 does not have a data classification, computer system 110 analyzes and selects a particular classification model 150 from classification models 150 stored in memory 114. For example, computer system 110 may compare data attributes (e.g., a column name, a datatype, a data size, etc.) to similar data attributes of classification models 150 in order to select a particular classification model 150 for data column 121. Once a particular classification model 150 is chosen for data column 121, computer system 110 then applies a data classification 160 of the particular classification model 150 to the data column 121. In some embodiments, computer system 110 applies data classification 160 to data column 121 by sending data classification 160 to a classification server 130 where it is applied to data column 121 in classification database 135. In other embodiments, computer system 110 may send data classification 160 to the data server 120 where data column 121 was extracted, and data classification 160 is applied to data column 121 in database 125. As a result, data classification 160 may be applied to data column 121 where data column 121 may otherwise linger for long amounts of time without a data classification. In situations where data within data column 121 is sensitive information (e.g., social security numbers), the automatic application of data classification 160 to data column 121 secures the data and prevents unwanted access by unauthorized personnel.

FIG. 2 illustrates example operations of the system for early change detection and data protection of FIG. 1, according to certain embodiments. This figure illustrates three different situations where a data table 122 of a database 125 within data server 120 has been updated or created by a user, thereby triggering computer system 110 to apply data classifications 160 to a particular data column 121. As a result, the newly-created or modified data column 121 may automatically have a data classification 160 applied to data column 121 where otherwise data column 121 may remain unclassified for long periods of time.

In a first example operation, a user updates or creates an employee data table 122A in database 125A of data server 120A. In this example, employee data table 122A contains two data columns 121: a "name" data column 121A-1 and an "office" data column 121A-2. Computer system 110 periodically accesses data server 120A (e.g., once every hour) to check whether any data table 122 within database 125A has been created or modified at the column level since the last periodic check. In this scenario, computer system 110 detects that data table 122A has been created or modified at the column level since the last periodic check. Computer system 110 then determines whether each data column 121A-1 and 121A-2 already has a data classification. In this example, computer system 110 determines that data column 121A-2 already contains a data classification, but that data column 121A-1 does not contain a data classification. Computer system 110 therefore ignores data column 121A-2 but extracts data column 121A-1. Computer system 110 then determines a particular classification model 150 from classification models 150 stored in memory 114 to use for data column 121A-1. For example, computer system 110 may compare data attributes (e.g., the column name of "office", a datatype of column "office", a data size of column "office", etc.) to similar data attributes of classification models 150 in order to select a particular classification model 150 for data column 121A-1. In this example, computer system 110 determines that classification model 150A has similar data attributes to data column 121A-1 and is therefore chosen for data column 121A-1. Computer system 110 then applies a data classification 160A of "Classification A" from classification model 150A to data column 121A-1 by sending data classification 160A to classification server 130. At classification server 130, data classification 160A is applied to data column 121A-1 in classification database 135. As a result, data classification 160A is applied to data column 121A-1 where data column 121A-1 may otherwise linger for long amounts of time without a data classification.

In a second example operation, a user updates or creates an employee data table 122B in database 125B of data server 120B. In this example, employee data table 122B contains two data columns 121: a "name" data column 121B-1 and a "social security number" data column 121B-2. Computer system 110 periodically accesses data server 120B (e.g., once every hour) to check whether any data table 122 within database 125B has been created or modified at the column level since the last periodic check. In this scenario, computer system 110 detects that data table 122B has been created or modified at the column level since the last periodic check. Computer system 110 then determines whether each data column 121B-1 and 121B-2 already has a data classification. In this example, computer system 110 determines that data column 121B-1 already contains a data classification, but that data column 121B-2 does not contain a data classification. Computer system 110 therefore ignores data column 121B-1 but extracts data column 121B-2. Computer system 110 then determines a particular classification model 150 from classification models 150 stored in memory 114 to use for data column 121B-2. For example, computer system 110 may compare data attributes (e.g., the column name of "social security number", a datatype of column "social security number", a data size of column "social security number", etc.) to similar data attributes of classification models 150 in order to select a particular classification model 150 for data column 121B-2. In this example, computer system 110 determines that classification model 150B has similar data attributes to data column 121B-2 and is therefore chosen for data column 121B-2. Computer system 110 then applies a data classification 160B of "Classification B" from classification model 150B to data column 121B-2 by sending data classification 160B to classification server 130. At classification server 130, data classification 160B is applied to data column 121B-2 in classification database 135. As a result, data classification 160B is applied to data column 121B-2 where data column 121B-2 may otherwise linger for long amounts of time without a data classification.

In a third example operation, a user updates or creates a salary data table 122C in database 125C of data server 120C. In this example, salary data table 122C contains three data columns 121: a "name" data column 121C-1, a "salary" data column 121C-2, and a "department" data column 121C-3. Computer system 110 periodically accesses data server 120C (e.g., once every hour) to check whether any data table 122 within database 125C has been created or modified at the column level since the last periodic check. In this scenario, computer system 110 detects that data table 122C has been created or modified at the column level since the last periodic check. Computer system 110 then determines whether each data column 121C-1, 121C-2, and 121C-3 already has a data classification. In this example, computer system 110 determines that data columns 121C-1 and 121C-2 already contain a data classification, but that data column 121C-3 does not contain a data classification. Computer system 110 therefore ignores data columns 121C-1 and 121C-2 but extracts data column 121C-3. Computer system 110 then determines a particular classification model 150 from classification models 150 stored in memory 114 to use for data column 121C-3. For example, computer system 110 may compare data attributes (e.g., the column name of "department", a datatype of column "department", a data size of column "department", etc.) to similar data attributes of classification models 150 in order to select a particular classification model 150 for data column 121C-3. In this example, computer system 110 determines that classification model 150C has similar data attributes to data column 121C-3 and is therefore chosen for data column 121C-3. Computer system 110 then applies a data classification 160C of "Classification C" from classification model 150C to data column 121C-3 by sending data classification 160C to classification server 130. At classification server 130, data classification 160C is applied to data column 121C-3 in classification database 135. As a result, data classification 160C is applied to data column 121C-3 where data column 121C-3 may otherwise linger for long amounts of time without a data classification.

FIG. 3 illustrates an example method 300 for early change detection and data protection, according to certain embodiments. At operation 310, method 300 periodically accesses one or more databases stored in a plurality of data servers. In some embodiments, the one or more databases are databases 125 and the plurality of data servers are data servers 120. In some embodiments, method 300 accesses the one or more databases once in a predefined interval such as one hour. In some embodiments, the one or more databases are pre-production development databases (e.g., software development databases that are not currently being used for production/released software).

At operation 320, method 300 determines that a data table in the one or more databases of operation 310 has been newly created or modified. In some embodiments, the data table is data table 122. In some embodiments, method 300 determines that a data table in the one or more databases of operation 310 has been newly created or modified by analyzing a time stamp of the data table. The time stamp may indicate, for example, a time/date that the data table was created or last modified. If method 300 determines that the date/time of the time stamp is after the previous access of the data table by method 300, method 300 may determine that the data table is newly created or modified and therefore proceed to operation 330.

At operation 330, method 300 extracts a data column from the data table that has been newly created or modified of operation 320. In some embodiments, the data column is data column 121. In some embodiments, the data column includes attributes such as a column name, a datatype, a data size, and creator information.

At operation 340, method 300 determines whether the data column of operation 330 has an existing data classification. In some embodiments, the data classification is data classification 160. If method 300 determines in operation 340 that the data column of operation 330 does not have an existing data classification, method 300 proceeds to operation 350. Otherwise, if method 300 determines in operation 340 that the data column of operation 330 has an existing data classification, method 300 may end.

At operation 350, method 300 accesses a plurality of classification models and determines a particular classification model to use for the data column of operation 330. In some embodiments, the classification models are classification models 150. In some embodiments, each classification model indicates or stores a data classification to apply to one or more data columns of the one or more databases. In some embodiments, operation 350 determines the particular classification model to use for the data column of operation 330 by comparing data attributes of the data column to data attributes of the plurality of classification models. For example, certain embodiments utilize natural language processing (NLP) to compare a name attribute of the data column to name attributes of the classification models. Once method 300 matches the name attribute of the data column to a particular name attribute of a particular classification model within a predetermined accuracy, method 300 selects the particular classification model to use for the data column. The selected classification model indicates or stores a particular data classification to apply to the data column.

At operation 360, method 300 sends one or more instructions to a classification server to apply the particular data classification of the selected classification model to the data column. In some embodiments, the classification server stores a classification database such as classification database 135. The classification server stores the particular data classification in the classification database and associates the particular data classification with the data column, thereby applying the particular data classification of the selected classification model to the data column.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order. That is, the steps of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although several embodiments have been illustrated and described in detail, it will be recognized that substitutions and alterations are possible without departing from the spirit and scope of the present disclosure, as defined by the appended claims.

The invention claimed is:

1. A system for automatically applying data type classifications to data, the system comprising:
   a plurality of data servers, each data server comprising one or more databases;
   a classification server comprising a classification database;
   a memory configured to store a plurality of classification models, wherein:
      each classification model is associated with one or more column attributes and a data type classification that applies to data columns that are associated with the one or more column attributes; and the data type classification indicates a type of data that is stored in a data column;
a processor communicatively coupled to the memory, the processor configured to:
determine, by periodically analyzing the one or more databases, that a data table has been newly created or modified;
extract a data column from the data table that has been newly created or modified;
determine that the data column does not have an existing data type classification;
in response to determining that the data column does not have an existing data type classification, determine from the plurality of classification models, a particular classification model to use for the data column by:
determining one or more column attributes associated with the data column;
determining from the plurality of classification models the particular classification model that is associated with the one or more column attributes of the data column; and
apply a particular data type classification associated with the particular classification model to the data column by:
sending the particular data type classification to the classification server, wherein the particular data type classification is applied to the data column in the classification database of the classification server.

2. The system of claim 1, wherein the particular data type classification is a privacy classification this is operable to restrict access to the data column.

3. The system of claim 1, wherein the column attributes of the data column and the column attributes of the plurality of classification models comprise:
a column name;
a datatype;
a data size; and
creator information.

4. The system of claim 1, wherein determining from the plurality of classification models, by comparing data attributes of the data column to data attributes of the plurality of classification models, the particular classification model to use for the data column comprises utilizing natural language processing (NLP).

5. The system of claim 1, wherein the one or more databases are pre-production development databases.

6. The system of claim 1, wherein determining that a data table has been newly created or modified comprises:
accessing a time stamp of the data table, the time stamp indicating a time that the data table was created or modified;
determining a time of a previous access of the data table; and
comparing the time of the time stamp to the time of the previous access of the data table.

7. The system of claim 1, wherein the plurality of data servers comprise:
a SQL server;
an Oracle server;
a Hive server;
a Teradata server; or
a Hadoop server.

8. A method for automatically applying data type classifications to data, the method comprising:
accessing one or more databases stored in a plurality of data servers;
accessing a plurality of classification models, wherein:
each classification model is associated with one or more column attributes and a data type classification that applies to data columns that are associated with the one or more column attributes; and
the data type classification indicates a type of data that is stored in a corresponding data column;
determining, by periodically analyzing the one or more databases, that a data table has been newly created or modified;
extracting a data column from the data table that has been newly created or modified;
determining that the data column does not have an existing data type classification;
in response to determining that the data column does not have an existing data type classification, determining from the plurality of classification models a particular classification model to use for the data column by:
determining one or more column attributes associated with the data column;
determining from the plurality of classification models the particular classification model that is associated with the one or more column attributes of the data column; and
applying a particular data type classification associated with the particular classification model to the data column by:
sending the particular data type classification to the classification server, wherein the particular data type classification is applied to the data column in the classification database of the classification server.

9. The method of claim 8, wherein the particular data type classification is a privacy classification this is operable to restrict access to the data column.

10. The method of claim 8, wherein the column attributes of the data column and the column attributes of the plurality of classification models comprise:
a column name;
a datatype;
a data size; and
creator information.

11. The method of claim 8, wherein determining from the plurality of classification models, by comparing data attributes of the data column to data attributes of the plurality of classification models, the particular classification model to use for the data column comprises utilizing natural language processing (NLP).

12. The method of claim 8, wherein the one or more databases are pre-production development databases.

13. The method of claim 8, wherein determining that a data table has been newly created or modified comprises:
accessing a time stamp of the data table, the time stamp indicating a time that the data table was created or modified;
determining a time of a previous access of the data table; and
comparing the time of the time stamp to the time of the previous access of the data table.

14. The method of claim 8, wherein the plurality of data servers comprise:
a SQL server;
an Oracle server;
a Hive server;
a Teradata server; or
a Hadoop server.

15. A system comprising:
a memory configured to store a plurality of classification models, wherein:
   each classification model is associated with one or more column attributes and a data type classification that applies to data columns that are associated with the one or more column attributes; and
   the data type classification indicates a type of data that is stored in a corresponding data column;
a processor communicatively coupled to the memory, the processor configured to:
   periodically access one or more databases stored in one or more data servers;
   determine, by periodically analyzing the one or more databases, that a data table has been newly created or modified;
   determine that a data column of the data table does not have an existing data type classification;
   in response to determining that the data column does not have an existing data type classification, determine from the plurality of classification models, a particular classification model to use for the data column by:
      determining one or more column attributes associated with the data column;
      determining from the plurality of classification models the particular classification model that is associated with the one or more column attributes of the data column; and
   apply a particular data type classification associated with the particular classification model to the data column by:
      sending the particular data type classification to the classification server, wherein the particular data type classification is applied to the data column in the classification database of the classification server.

16. The system of claim 15, wherein the particular data type classification is a privacy classification this is operable to restrict access to the data column.

17. The system of claim 15, wherein the column attributes of the data column and the column attributes of the plurality of classification models comprise:
   a column name;
   a datatype;
   a data size; and
   creator information.

18. The system of claim 15, wherein determining from the plurality of classification models, by comparing data attributes of the data column to data attributes of the plurality of classification models, the particular classification model to use for the data column comprises utilizing natural language processing (NLP).

19. The system of claim 15, wherein determining that a data table has been newly created or modified comprises:
   accessing a time stamp of the data table, the time stamp indicating a time that the data table was created or modified;
   determining a time of a previous access of the data table; and
   comparing the time of the time stamp to the time of the previous access of the data table.

20. The system of claim 15, wherein the one or more data servers comprise:
   a SQL server;
   an Oracle server;
   a Hive server;
   a Teradata server; or
   a Hadoop server.

* * * * *